(12) United States Patent
Cheung et al.

(10) Patent No.: US 7,025,356 B1
(45) Date of Patent: Apr. 11, 2006

(54) AIR-OIL SEAL

(75) Inventors: Kin-Leung Cheung, Toronto (CA);
William Ting-Chel Hung, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 11/014,972

(22) Filed: Dec. 20, 2004

(51) Int. Cl.
*F16J 15/453* (2006.01)

(52) U.S. Cl. ............ 277/415; 277/303; 415/174.4
(58) Field of Classification Search ........... 277/415, 277/303; 415/173.4, 174.4, 174.5
See application file for complete search history.

(56) References Cited

U.S. PATENT DOCUMENTS

| | | | |
|---|---|---|---|
| 3,547,455 A | 12/1970 | Daunt | |
| 3,843,278 A | 10/1974 | Torell | |
| 4,248,566 A * | 2/1981 | Chapman et al. | 415/26 |
| 4,402,515 A * | 9/1983 | Malott | 277/415 |
| 4,460,185 A | 7/1984 | Grandey | |
| 5,149,251 A | 9/1992 | Scanlon et al. | |
| 5,201,845 A * | 4/1993 | Allmon et al. | 415/169.1 |
| 5,352,312 A | 10/1994 | Guillot | |
| 5,388,959 A | 2/1995 | Forrester et al. | |
| 5,472,315 A * | 12/1995 | Alexander et al. | 415/173.4 |
| 5,540,553 A | 7/1996 | Goto et al. | |
| 5,743,707 A | 4/1998 | Battig et al. | |
| 6,012,900 A | 1/2000 | Kennedy et al. | |
| 6,106,224 A | 8/2000 | Sheth et al. | |
| 6,183,195 B1 * | 2/2001 | Tremaine | 415/145 |
| 6,206,642 B1 | 3/2001 | Matheny et al. | |
| 6,312,224 B1 | 11/2001 | Knott et al. | |
| 6,325,381 B1 | 12/2001 | von Engelbrechten | |
| 6,352,264 B1 | 3/2002 | Dalzell, Jr. et al. | |
| 6,375,410 B1 | 4/2002 | Clouse et al. | |
| 6,565,257 B1 | 5/2003 | Kennedy et al. | |
| 6,575,696 B1 | 6/2003 | Lyons et al. | |

* cited by examiner

*Primary Examiner*—Alison K. Pickard
(74) *Attorney, Agent, or Firm*—Ogilvy Renault LLP

(57) ABSTRACT

An air-oil seal having a runner surface comprising at least one component selected from the group consisting of: polyetheretherketone; polyetherimide; polyphenylene sulfide; and polyetherketoneketone.

8 Claims, 1 Drawing Sheet

AIR-OIL SEAL

TECHNICAL FIELD

The invention relates generally to rotary seals and, more particularly, to a seal for sealing a rotating shaft.

BACKGROUND OF THE ART

Labyrinth seals are often used as air-oil seals to provide sealing of rotating shafts of bearing compartments and gear cases, etc. Labyrinth seals typically comprise knife edges or teeth or fins which rotate relative to a surrounding seal land or runner, the knife edges having tight tip clearances with a surface of the land or runner. The relative rotation between the knife edges and the runner of labyrinth seals, however, can tend to cause rubbing wear on the runner surface, which can eventually lead to particles of the runner being shaved off and ingested into an adjacent bearing supporting the shaft. Knife edge wear also results. These rubs can significantly reduce the sealing capability and ingested particles can also damage bearings, gears and/or other components adjacent to such seal if these components ingest the particles. Polymers, for example, are avoided as runners because they rub easily and the polymeric particles could adversely effect bearings, gear surfaces, etc.

An improved seal runner surface for a labyrinth seal is therefore desired, particularly for use as a shaft seal.

SUMMARY OF THE INVENTION

It is therefore an object of this invention to provide an improved runner for a labyrinth air-oil seal.

In one aspect, the present invention provides a labyrinth seal comprising at least one knife edge and a runner surface, the runner surface including a material selected from the group consisting of: polyetheretherketone; polyetherimide; polyphenylene sulfide; and polyetherketoneketone.

In a second aspect, the present invention provides a shaft assembly comprising a rotatable shaft supporting an oiled component and at least one labyrinth seal providing air-oil sealing between the rotating shaft and an adjacent element, the labyrinth seal having at least one knife edge and a runner mounted for relative rotation, the runner having a runner surface facing the knife edge comprised of a material selected from the group consisting of: polyetheretherketone; polyetherimide; polyphenylene sulfide; and polyetherketoneketone.

In a third aspect, the present invention provides a method of sealing an air-oil interface, the method comprising the steps of: providing a labyrinth seal with a runner material on a runner surface thereof; and selecting the runner material from the group consisting of: polyetheretherketone; polyetherimide; polyphenylene sulfide; and polyetherketoneketone.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
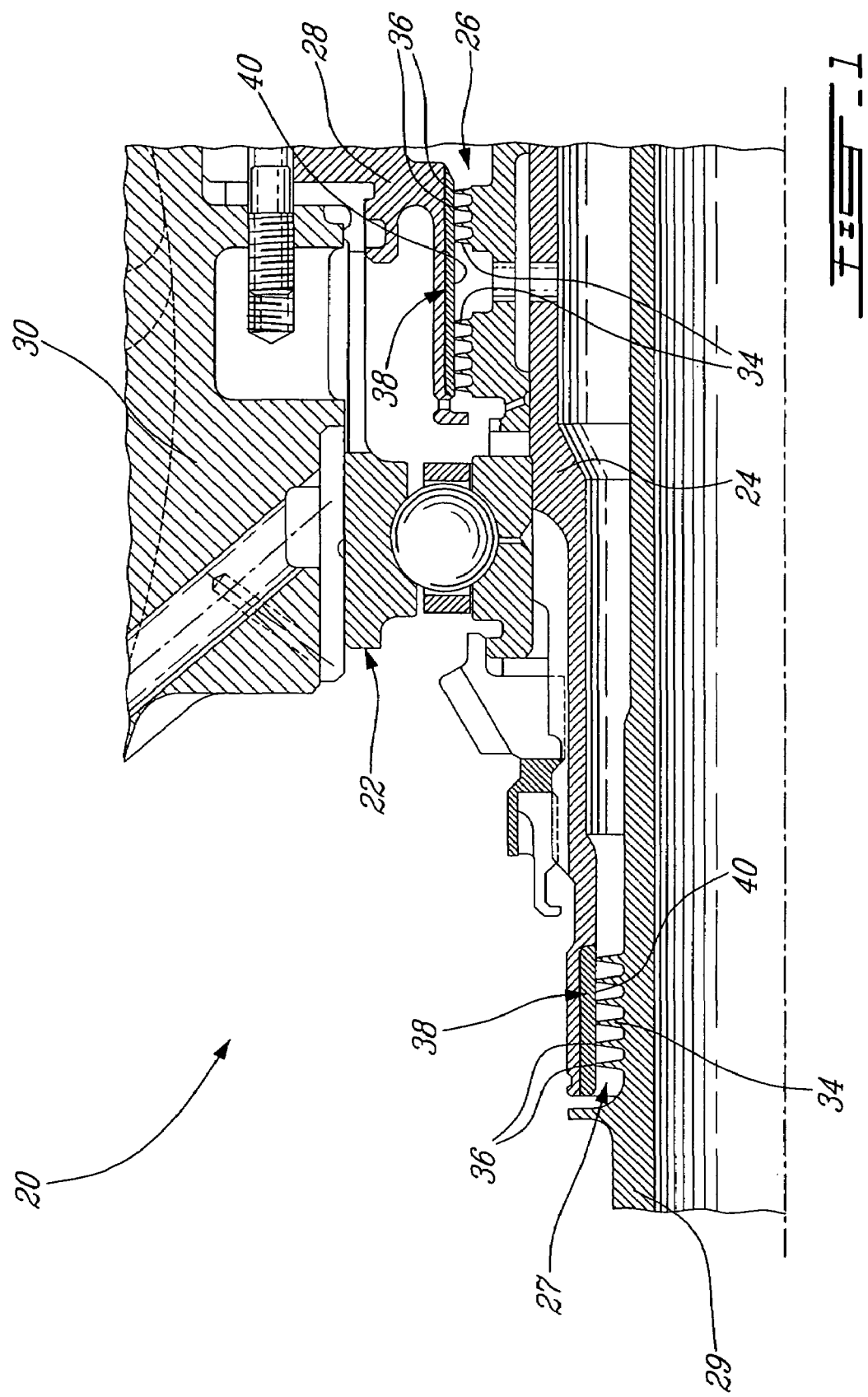
FIG. 1 is a cross-sectional view of a bearing cavity labyrinth seal having a runner with an abradable surface in accordance with the present invention.

Referring to FIG. 1, a shaft bearing assembly 20 comprises generally at least one a bearing 22 supporting a rotating shaft 24 and at least one labyrinth seal 26 providing sealing between the rotating shaft 24 and an adjacent element 28, such as a portion of the stationary outer casing 30. In the embodiment depicted in FIG. 1, a second labyrinth seal 27 is provided between the rotating shaft 24 and a second rotating shaft 29 disposed concentrically within the rotating shaft 24. The labyrinth seals 26, 27 generally comprise a plurality of knife edges 34 which rotate with the shaft relative to a juxtaposed runner 38. Tips 36 of the knife edges are disposed adjacent to the runner surface 40 of the runner 38 in very tight clearance thereto such that a substructure fluid seal is provided there between. Although generally the knife edges are disposed on a shaft which rotates within a stationary surrounding runner, it is to be understood that the converse is also possible, namely that the runner surface rotates and the knife edges of the labyrinth seal disposed in close juxtaposition thereto remains stationary. Further, as depicted for the labyrinth seal 27, both portions of the labyrinth seal may be rotating. The configuration of the seal described above is thus far generic.

According to the present invention, the runner 38 is preferably an insert made of reinforced composite thermal plastic material which is bonded or otherwise affixed to the base element adjacent the rotating shaft. Particularly, the reinforced composite thermal plastic used includes at least one of polyetheretherketone, polyetherimide, polyphenylene sulfide, and polyetherketoneketone.

Such reinforced composite thermal plastics provide several advantages over traditionally used metallic abradable seal materials and other non-metallic polymer abradable materials. Surprisingly, unlike other polymers, when repeated rubs and/or deep rubs which liberates particles from the runner surface 40, such debris particles of the mentioned reinforced composite thermal plastics will not cause any significant damage, to bearings, gears, etc, should they be ingested by such systems. This is not the case with metallic runner materials of the prior art, or other non-metallic abradable materials of the prior art, such as Teflon™ or thermoset plastics (see U.S. Pat. No. 4,460,185). Particularly, thermoset plastics may trap and embed metallic particles (eg. from debris contained in the oil) which could also cause damage to a bearing or gear if the thermoset plastic particles were ingested. Halogenated hydrocarbons, such as Teflon™ for example, may also release halogens, as a result of decomposition of the material caused by frictional heating of the surface, which may tend to react with titanium components and cause stress corrosion cracks, making the use of such materials undesirable with titanium engine components. The present invention is therefore useful in aerospace applications, where titanium is often used, such as in gas turbine engines.

In contrast to these prior art materials, reinforced composite thermal plastics such as polyetheretherketone (PEEK), polyetherimide, polyphenylene sulfide, and polyetherketoneketone overcome these problems, as the inventors have discovered that these thermal plastics, unlike thermoset materials, do not cause the type of abrasive damage to bearings, gears, etc. which is usually associated with plastic seal runners.

The use of PEEK is known for use as an abradable layer in blade tip sealing applications—see U.S. Pat. No. 6,352,264 to Dalzell et al. Such air-only seals, however, do not have the same concerns indicated above regarding rub debris fouling components in oil lubricated system adjacent the seal. Consequently, Dalzell et al. is unhelpful in directing one to a solution to the problem addressed by the present invention.

The composite mix of the thermal plastics of the present invention is preferably chosen such that a predetermined thermal expansion coefficient of the final composite substantially corresponds to that of the matching metallic structural components. Thus, improved clearance control is achieved as both the runner seal insert and the surrounding seal material will shrink and expand together compatibly.

The above description is meant to be exemplary only, and one skilled in the art will recognize that changes may be made to the embodiments described without departing from the scope of the invention disclosed. For example, although the present invention is described preferably in reference to its use in a gas turbine engine, it is to be understood that the labyrinth seal of the present invention may be used in any other applications in which there is a need to provide a seal about a rotating shaft, such as in pump, compressors and the like. Further, the runner surface of the present invention may be composed of a single named material, or may be a composite material made up of any combination of the named materials, or may comprise a layer(s) of the novel material over a more conventional base material. Still other modifications will be apparent to those skilled in the art, in light of a review of this disclosure, and such modifications are intended to fall within the scope of appended claims.

What is claimed is:

1. A method of sealing an air-oil interface, the method comprising the steps of:
    providing a labyrinth seal with a runner material on a runner surface thereof; and
    selecting the runner material from the group consisting of: polyetheretherketone; polyetherimide; polyphenylene sulfide; and polyetherketoneketone.

2. A shaft assembly comprising a rotatable shaft supporting an oiled component and at least one labyrinth seal providing air-oil sealing between the rotating shaft and an adjacent element, the labyrinth seal having at least one knife edge and a runner mounted for relative rotation, the runner having a runner surface facing the knife edge comprised of a material selected from the group consisting of: polyetheretherketone; polyetherimide; polyphenylene sulfide; and polyetherketoneketone.

3. The shaft bearing assembly as defined in claim 2, wherein the runner surface comprises a composite thermal plastic having at least one component selected from the group.

4. The shaft bearing assembly as defined in claim 3, wherein the composite thermal plastic is reinforced.

5. The shaft bearing assembly as defined in claim 2, wherein the adjacent element is a stationary casing.

6. The shaft bearing assembly as defined in claim 2, wherein the adjacent element is a second rotatable shaft concentric with the rotatable shaft.

7. The shaft bearing assembly as defined in claim 2, wherein the labyrinth seal is metallic and the runner surface is an insert mounted thereto.

8. The shaft bearing assembly as defined in claim 7, wherein the composite thermal plastic has a predetermined thermal expansion coefficient which substantially corresponds to that of the metallic labyrinth seal.

* * * * *